(12) United States Patent
Frazier et al.

(10) Patent No.: US 12,091,153 B2
(45) Date of Patent: Sep. 17, 2024

(54) COMPOSITE WINDOW WITH THERMAL SHOCK RESISTANCE, AND METHOD TO INCREASE THERMAL SHOCK RESISTANCE OF A COMPOSITE WINDOW

(71) Applicant: Raytheon Company, Waltham, MA (US)

(72) Inventors: Gary A. Frazier, Garland, TX (US); Catherine Trent, Allen, TX (US); Kevin M. Chapla, Melissa, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/386,752

(22) Filed: Jul. 28, 2021

(65) Prior Publication Data
US 2022/0033053 A1    Feb. 3, 2022

Related U.S. Application Data

(60) Provisional application No. 63/058,174, filed on Jul. 29, 2020.

(51) Int. Cl.
*B64C 1/14* (2006.01)
*B64C 30/00* (2006.01)
*B64F 5/10* (2017.01)
*G01J 1/04* (2006.01)

(52) U.S. Cl.
CPC .......... *B64C 1/1492* (2013.01); *B64C 1/1484* (2013.01); *B64C 30/00* (2013.01); *B64F 5/10* (2017.01); *G01J 1/0403* (2013.01)

(58) Field of Classification Search
CPC ............ B64C 30/00; B64C 1/36; B64C 1/38; B64C 1/1476; B64C 1/1484; B64C 1/1492; B64G 1/36; B64G 1/66
See application file for complete search history.

(56) References Cited

U.S. PATENT DOCUMENTS

| | | | | |
|---|---|---|---|---|
| 4,726,507 A | * | 2/1988 | Landram | F17C 13/00 228/124.1 |
| 2002/0109038 A1 | * | 8/2002 | Goldman | F41G 7/2293 244/3.16 |
| 2006/0243779 A1 | * | 11/2006 | Rau | G03F 7/70825 228/124.1 |
| 2018/0120071 A1 | * | 5/2018 | Smith | F25D 5/00 |
| 2021/0033371 A1 | * | 2/2021 | Frey, Jr. | G01J 11/00 |

FOREIGN PATENT DOCUMENTS

| | | | |
|---|---|---|---|
| CN | 209784632 | * | 12/2019 |
| KR | 10-2020-0050317 | * | 5/2020 |

* cited by examiner

*Primary Examiner* — Joshua J Michener
*Assistant Examiner* — Ka Chun Leung
(74) *Attorney, Agent, or Firm* — CANTOR COLBURN LLP

(57) ABSTRACT

A window installation includes a phase-change filler material sealing an outer edge of the window, and coupling the window to a frame around the window. The filler material in a solid state rigidly holds the window in place. When the filler material is in a liquid state it allows the window to float in its coupling to the frame. There may be supports within the rigid material that contact the window, but allow the window to expand or contract by sliding along the supports. The installation may be useful in situations where the window is subjected to thermal shocks, or other sorts of heating. The installation may be used for a sensor window, and may be part of a hypersonic vehicle.

20 Claims, 3 Drawing Sheets

COMPOSITE WINDOW WITH THERMAL SHOCK RESISTANCE, AND METHOD TO INCREASE THERMAL SHOCK RESISTANCE OF A COMPOSITE WINDOW

RELATED APPLICATION

This application claims priority from U.S. Provisional Application 63/058,174, filed Jul. 29, 2020, which is incorporated by reference in its entirety.

FIELD

This disclosure is in the field of windows exposed to thermal shocks, and associated methods.

BACKGROUND

Most windows are constrained in a rigid frame to prevent translation or dislocation during use. Often the window must be sealed mechanically and electrically within the frame to provide an electrical ground to drain off static charge and provide electromagnetic interference (EMI) protection.

High temperature windows are needed for electro-optical/infra-red (EO/IR) sensors. One of the limiting factors for installing EO/IR sensors on hypersonic weapons and platforms is premature failure of the window due to thermal shock caused by improper mechanical fixturing.

When hypersonic window materials heat up stress is generated between the window and its mounting structure. One prior attempt to solve the problem is with coefficient of thermal expansion (CTE) matching material. This works well for lower temperature systems, but often fails for window systems that must tolerate large variations in ambient temperature, such as systems where the ambient temperature varies from room temperature (30° C.) to 1000° C. during flight.

Another attempt to minimize framing stress is to use slip gaskets, such as niobium floating gaskets.

A further approach is to use brazing, a high-temperature soldering process.

SUMMARY

This disclosure solves the problem of early stress failure of thermally shocked windows due to improper mechanical fixturing.

According to an aspect of the disclosure, by mounting the window in metals with certain low melting points, at certain desired temperatures, the framing metal melts and the window is effectivity floating within a volume of molten metal and zero stress is generated between the window and the frame.

According to another aspect of the disclosure, floating hypersonic windows allow for zero-stress between the window and the frame.

According to additional aspects of the disclosure, 1) a window is rigidly mounted at ambient temperature but floats during thermal shock events; 2) high surface tension in the fluid gasket prevents air, environmental fluids, or coolant from penetrating the seal; 3) possible materials include metals (tin, indium, gallium, bismuth) or alloys (AgSn, $Sn_4Au$, $Se_2Ge$—chalcogenides); and/or 4) a metallic sealant supports EMI protection similar to a solder seal.

Another aspect includes making the window thin, which lowers window surface temperature by placing the coolant (thermally) closer to the thermal heat source. The making of the window thin is not a necessary feature. While the floating frame described herein will work with any window thickness, the floating frame may have a particular benefit in enabling use of a thin window, or in other words allowing reduction in window thickness. A thin window may advantageously minimize (or reduce) thermal shock effects.

According to an aspect of the disclosure, a window has thermal shock resistance feature(s) operatively coupled thereto.

According to an embodiment of any paragraph(s) of this summary, the window is supported by a rigid frame.

According to an embodiment of any paragraph(s) of this summary, a free support or standoff supports the window.

According to an embodiment of any paragraph(s) of this summary, the free support(s)/standoff(s) support the window freely without constraining lateral expansion/contraction.

According to an embodiment of any paragraph(s) of this summary, a filler material supports the window.

According to an embodiment of any paragraph(s) of this summary, the filler material is around the free support.

According to an embodiment of any paragraph(s) of this summary, the filler material is in contact with the free support.

According to an embodiment of any paragraph(s) of this summary, the filler material is a phase-change material.

According to an embodiment of any paragraph(s) of this summary, the filler material is a meltable material.

According to an embodiment of any paragraph(s) of this summary, the filler material becomes fluidic after exceeding a predetermined temperature.

According to an embodiment of any paragraph(s) of this summary, the filler material floatingly supports the window when the filler material is in a fluidic state.

According to an embodiment of any paragraph(s) of this summary, the filler material is metal material.

According to an embodiment of any paragraph(s) of this summary, the metal material is a material selected from the group consisting of tin, indium, gallium, bismuth, or combinations thereof.

According to an embodiment of any paragraph(s) of this summary, the filler material is an alloy.

According to an embodiment of any paragraph(s) of this summary, the alloy is selected from the group consisting of AgSn, $Sn_4Au$, and $Se_2Ge$.

According to an embodiment of any paragraph(s) of this summary, the filler material is a chalcogenide.

According to an embodiment of any paragraph(s) of this summary, the filler material attains a fluidic state under predetermined conditions.

According to an embodiment of any paragraph(s) of this summary, the filler material is part of a floating seal between the window and the frame.

According to an embodiment of any paragraph(s) of this summary, the filler material is electrically conductive.

According to an embodiment of any paragraph(s) of this summary, the filler material provides EMI shielding.

According to an embodiment of any paragraph(s) of this summary, the filler material has a phase change temperature below a thermal shock limit of the window.

According to an embodiment of any paragraph(s) of this summary, viscosity and/or surface tension of the filler material is/are chosen to prevent significant motion of the clip under pressure loading.

According to an embodiment of any paragraph(s) of this summary, the filler material is a meltable solder.

According to an embodiment of any paragraph(s) of this summary, the filler material is a glass material.

According to an embodiment of any paragraph(s) of this summary, the glass material has a variable viscosity, or is capable of having any of a variety of viscosities.

According to an embodiment of any paragraph(s) of this summary, the window includes an upper window material and a lower window material.

According to an embodiment of any paragraph(s) of this summary, the upper window material is a porous material.

According to an embodiment of any paragraph(s) of this summary, the upper window material is a continuous material.

According to an embodiment of any paragraph(s) of this summary, the window is further in combination with a coolant.

According to an embodiment of any paragraph(s) of this summary, the coolant cools the window.

According to an embodiment of any paragraph(s) of this summary, flow of the coolant structurally supports the window.

According to an embodiment of any paragraph(s) of this summary, surface tension of the filler material is high enough so that the coolant flowing behind the slip (window) is excluded from the filler volume.

According to an embodiment of any paragraph(s) of this summary, the window combination further includes a heater or heat source operatively coupled to the filler material.

According to an embodiment of any paragraph(s) of this summary, the heater or heat source may be used to selectively change phase or state of the filler material.

According to an embodiment of any paragraph(s) of this summary, the heater or heat source includes an electrical heater or heat source.

According to an embodiment of any paragraph(s) of this summary, a method of mitigating thermal shock in a window, using the device(s) described.

According to an embodiment of any paragraph(s) of this summary, the method includes using a floating seal to relieve stresses in the window when the window is exposed to a thermal shock.

According to an embodiment of any paragraph(s) of this summary, the floating seal includes a floating state and a non-floating state.

According to an embodiment of any paragraph(s) of this summary, the transition between the floating state and the non-floating state is triggered by a temperature or pressure change.

According to an embodiment of any paragraph(s) of this summary, the transition between the floating state and the non-floating state includes transition of a filler material from a non-fluidic state to a fluidic state.

According to an aspect of the disclosure, a window installation includes: a window; a frame; and a filler material between the window and the frame, wherein filler material is a phase-change material that provides a floating connection between the window and the frame when the filler material is in a liquid state, and that provides a connection between the window and the frame that is more rigid than the floating connection, when the filler material is in a solid state.

According to an embodiment of any paragraph(s) of this summary, the installation further includes a wetting agent on part of an external surface of the window, to control adherence between the window and the filler material.

According to an embodiment of any paragraph(s) of this summary, the filler material is configured to use surface tension to maintain the window in place when the filler material is in the liquid state.

According to an embodiment of any paragraph(s) of this summary, the filler material has a thickness of 50 micrometers or less.

According to an embodiment of any paragraph(s) of this summary, the filler material has a thickness of 20 micrometers or less.

According to another aspect of the disclosure, a hypersonic vehicle includes: a window installation that includes: a window; a frame; and a filler material between the window and the frame, wherein filler material is a phase-change material that provides a floating connection between the window and the frame when the filler material is in a liquid state, and that provides a connection between the window and the frame that is more rigid than the floating connection, when the filler material is in a solid state; and a sensor operatively coupled to the window; wherein the filler material is configured to change phase during flight of the hypersonic vehicle.

According to yet another aspect of the disclosure, a method of supporting a window includes the steps of: connecting the window to a frame with a filler material, wherein the filler material is a phase-change filler material; providing a relatively rigid coupling between the window and the frame when filler material is in a solid state; and melting the filler material to provide a floating coupling between the window and the frame.

According to still another aspect of the disclosure, a method of assembling a window in a frame includes the steps of: coating an edge of the window with a filler material; placing the window in the frame; and melting the filler material, to cause the filler material to form a seal between the window and the frame.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed.

Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

A window installation includes a phase-change filler material sealing an outer edge of the window, and coupling the window to a frame around the window. The filler material in a solid state rigidly holds the window in place. When the filler material is in a liquid state it allows the window to float in its coupling to the frame. There may be supports within the rigid material that contact the window, but allow the window to expand or contract by sliding along the supports. The installation may be useful in situations where the window is subjected to thermal shocks, or other sorts of heating. The installation may be used for a sensor window, and may be part of a hypersonic vehicle.

Figure 1:
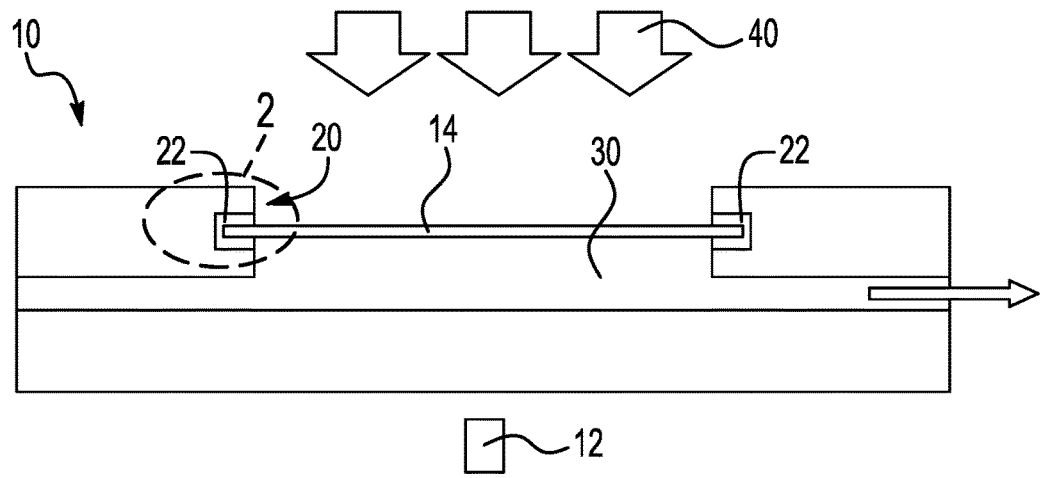
FIG. 1 is a schematic side view of a window installation according to an embodiment of the disclosure.
Figure 2:
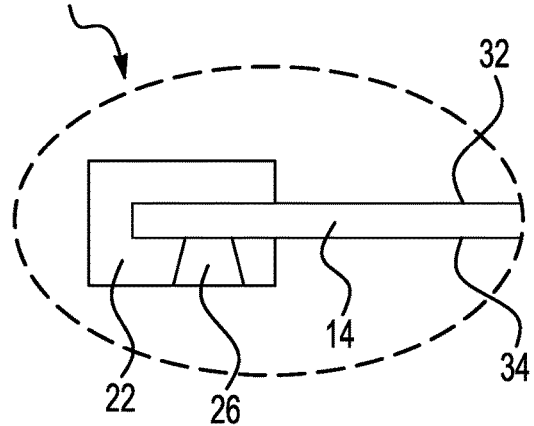
FIG. 2 is a side view of a portion of the window installation of FIG. 1.

With reference to FIGS. 1 and 2, parts of a window mount (or installation) 10 are shown. The mount or installation 10 may be part of a flight vehicle, such as a hypersonic flight vehicle. The installation 10 may be used for a suitable sensor 12, such as for an electro-optical/infra-red (EO/IR) sensor.

The installation (mount) 10 includes a thin outer window 14 that is mounted in a floating frame 16. This window 14 is captured by a frame seat 20 that is filled with a phase-change filler material 22 that melts when exposed to high temperatures. At ambient temperature the window 14 is rigidly held in the frame 16 by the filler material 22 (the filler material 22 in its solid state). During thermal shock the filler material 22 melts and allows the window 14 to float within the frame guides.

The filler material 22 may be selected to have a melting point above ambient temperature but well below the thermal shock limit of the window. The viscosity and surface tension of the filler material 22 may be chosen to prevent significant motion of the window 14 under pressure loading.

One or more free standoffs or supports 26 are included so the window 14 can be supported freely by the frame 16 without constraining lateral expansion and contraction. The surface tension of the filler material 22 may be made high so that coolant 30 flowing behind the slip is excluded from the filler material volume. In addition, the viscosity of the melted filler material 22 may be selected so that pressure difference between an outer window surface 32 and an inner window surface 34 does not lead to atmospheric leakage around the window 14, through the filler material 22.

Heating and/or pressure can come from a thermal shock 40, such as external to the mount 10. The thermal shock 40 itself may cause or contribute to melting of the filler material 22.

The result is a floating mount that maximizes the thermal shock resistance of a thin window while supporting active cooling behind the window. A metal (tin, indium, gallium, bismuth) or alloy (AgSn, $Sn_4Au$, $Se_2Ge$—chalcogenides), etc., can be used to maintain an electrical connection to the frame for the purposes of EMI protection.

The filler material 22 may be a meltable solder. Alternatively the filler material may be glass material, for example having a variable viscosity, or being capable of having any of a variety of viscosities.

More broadly, the filler material 22 may transition from a non-fluid state to a fluid state under predetermined conditions, such as reaching a predetermined temperature. The filler material 22 may be chosen to have desired or advantageous characteristics, for example having a transition (e.g., phase change) temperature selected for enabling the window to "float" under certain thermal conditions, and/or with the filler material in its fluidic state having a viscosity chosen to prevent leakage of the fluid (gas or coolant leakage, for example), but which also has desired stress-reducing characteristics in supporting the window.

The window 14 is rigidly mounted at ambient temperature but floats during thermal shock events. High surface tension in the fluid gasket (the filler material 22) prevents air or coolant from penetrating the seal. A metallic sealant (a metallic filler material) supports EMI protection similar to a solder seal. Making the window 14 thin lowers window surface temperature by placing the coolant 30 (thermally) closer to the thermal heat source.

In an embodiment the system (installation) 10 may be configured such that the fluidic material (the melted filler material 22) supports (floats) the window 14 when the coolant 30 is flowing around a surface of the window 14. In such an embodiment the window 14 may return to a semi-rigid mounting when the flow is stopped. Thus flow of the fluidic material may transition the system between two states, one (flowing) where the coolant material supports the window 14 fully (or a greater amount), and another (non-flowing) where the coolant material provides less support for the window 14. Flow of the coolant 30 may also serve to cool the window 14. Such flow may also prevent intrusion of external gases.

The seal may enter a "float" (fluidic) state from its initial (non-fluidic) state, and may be capable of returning to the initial (or non-fluidic) state. Electrical conductivity may be maintained in both states, for example for EMI shielding. Alternatively, in some embodiments it may not be necessary to maintain electrical conductivity.

In an embodiment the viscous fluid is electrically conductive in either its rigid or fluid state or both states and provides an electrical contact between any electrical coatings or bulk properties of the window and an electrically conducting frame.

The window 14 may be made of any of a variety of suitable materials. Examples include (but are not limited to) sapphire, fused quartz, germanium, gallium arsenide, zinc sulfide (such as multi-spectral zinc sulfide), silicon, and various suitable nanocomposites.

The window 14 may have any of a broad range of thickness. For example the window may have a thickness of 25 micrometers to 10 mm. A thickness of 1 mm to 10 mm may be suitable where the window 14 is supported by free standoffs or supports, such as the standoffs or supports 26 shown in FIG. 1. In embodiments where such supports are not used (as described below), the window may have a thickness of 25 micrometers to 1000 micrometers (1 mm).

Windows described herein may have any of a variety of suitable shapes. For example the window may be circular, with a seal on its circumference. Alternatively the window may have other suitable shapes, such as polygonal.

The coolant 30 may be any of a variety of suitable fluids. Examples include $CO_2$ gas, ambient air, dry nitrogen gas, and helium.

Figure 3:
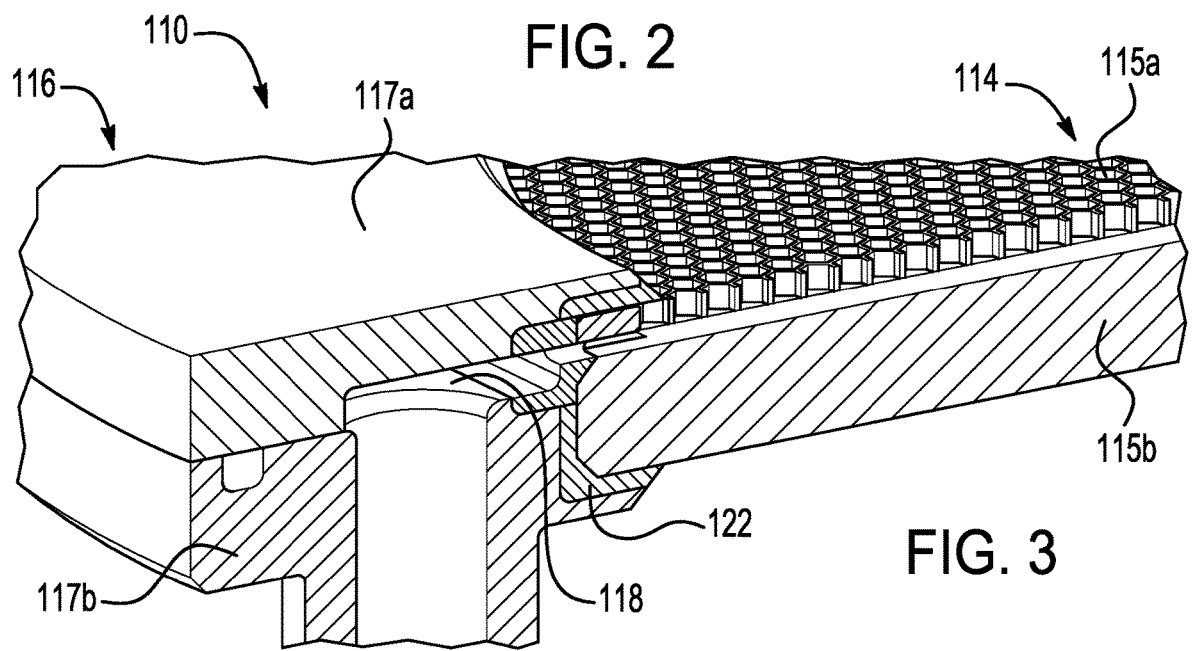
FIG. 3 is a partial cutaway view showing details of an embodiment of the disclosure.

FIG. 3 shows a mount (installation) 110 that includes a two-part window 114 that includes an upper window material 115a and a lower window material 115b, in a frame 116. The upper window material 115a may be porous, such as being a screen, or alternatively may be a continuous material. A phase-change filler material 122 provides a floating seal between the window 114 and the frame 116. The frame 116 may have multiple parts 117a and 117b that together define a channel 118 for flow of a coolant around a perimeter of the window 114. A filler material 122 couples together the window 114 and the frame 116.

Figure 4:
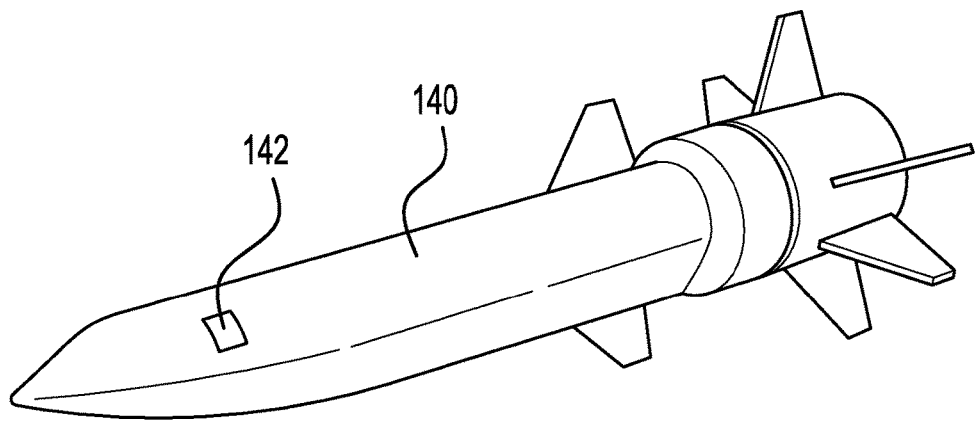
FIG. 4 is an oblique view of a hypersonic vehicle the includes the window installation of FIG. 1.

FIG. 4 shows a hypersonic vehicle 140 that include a window installation 142 such as described in various embodiments elsewhere herein, for instance the window installation 10 (FIG. 1) and the window installation 110 (FIG. 2). The hypersonic vehicle 140 may for example be a missile, although other types of flight vehicles are alternatives.

Figure 5:
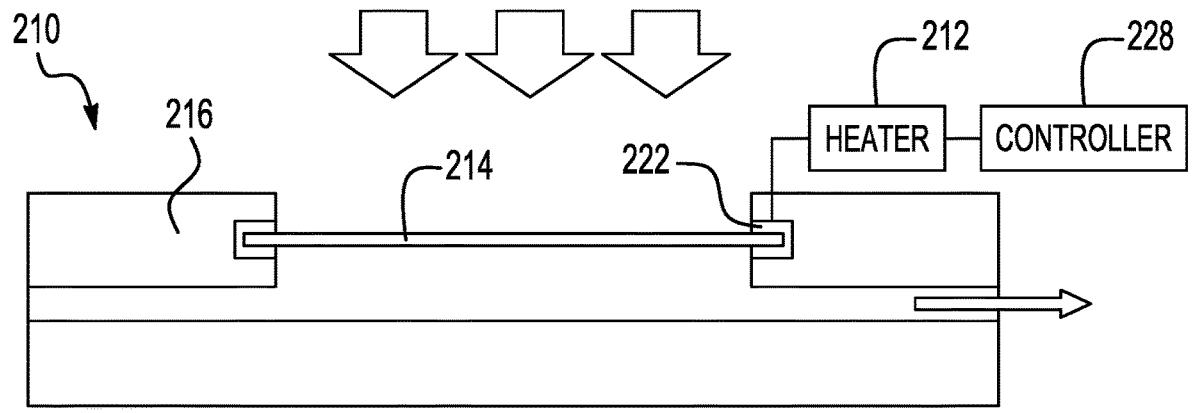
FIG. 5 is a schematic side view of a window installation that includes a heater, according to another embodiment of the disclosure.

Turning now to FIG. 5, in an embodiment of a mount 210 a heater or heat source 212 may be operatively coupled to the filler material 222, to allow selective phase change (such as melting) of the filler material 222. This may be done as an alternative to or in addition to phase change due to heating from the ambient thermal source, such as described above with regard to the window mount 10 (FIG. 1). The heater or heat source 212 may be any of a variety of suitable heaters, such as an electrical heater. The heater 212 may be switched off when the "float" condition (floating a window 214 relative to a frame 216) is not necessary (or desirable), such as when a thermal shock situation has passed. The heater 212 may be controlled by a suitable controller 228, which may receive commands, communications, and/or input from any of a variety of sources, for example determining when a thermal shock situation has passed, either directly or indirectly (examples of the latter being a predetermined altitude or time of flight).

Figure 6A:
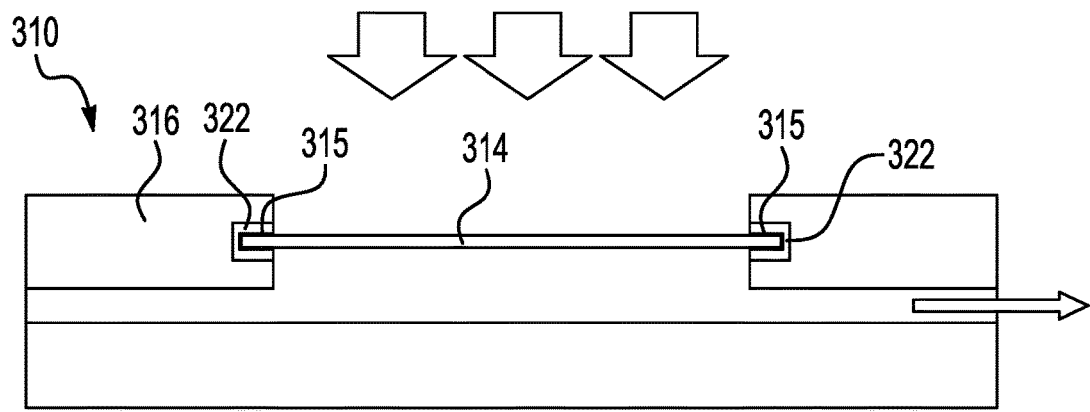
FIG. 6A is a schematic side view of a window installation that includes a wetting agent, according to yet another embodiment of the disclosure.

FIG. 6A shows another embodiment, a mount 310 in which a window 314 has a wetting agent 315 over part of its surface, to control adherence of a filler material 322 to parts of the window 314. The wetting agent 315 helps maintain contact of the filler material 322 to desired parts of the window 314 before, during, and/or after assembly of the window 314 into a frame 316. Thus not only does the wetting agent 315 encourage adherence over surface portions to which the wetting agent is absent, but also surface tension will tend to retain the filler 322 in the vicinity of the window 314 where the wetting agent 315 is located, due to the adhesion effect of wetting. Wetting also tends to maintain hermeticity since the filler material 322 tends to remain in intimate contact with the window 314 while in the viscous state.

The term "wetting agent" should be construed broadly as a material which affects (either positively or negatively) adherence of the filler material 322 to the window 314. In the illustrated embodiment the wetting agent 315 encourages adherence of the filler material 322 to the window 314. However in other embodiments the wetting agent could be a material selected to discourage adherence of the filler material 322 to the window 314. In such an arrangement the wetting agent would be placed on portions of surface of the window 314 where it was desired to prevent wetting by the filler material 314.

A purpose of the filler material 322 is to provide, when molten, a stress-free but hermetic seal between the window 314 and the frame 316. To be hermetic the filler material 322 in its viscous (for example molten) state must "wet" the window surface to ensure a gap-free interface between the window 314 and the filler material 322. Many liquid metals will wet semiconductor window materials such as silicon, germanium, and gallium arsenide. However some common alloys that melt at low temperatures will not directly wet glasses such as fused quartz and sapphire. In these cases a wetting agent can be deposited or fused to the window surface which serves as a wetting agent to allow the viscous filler material to easily attach to this intermediate layer. An example in the case of a sapphire window is a tin-silver or tin-indium alloy that bonds well to sapphire at high temperature, and is easily wet by a liquid tin, bismuth, or indium filler material. Quartz can be treated in a similar way by first depositing a thin layer of manganese-molybdenum alloy onto the portion of the quartz window where the filler material is located. Manganese-molybdenum alloys are well known to facilitate the subsequent brazing of a fused quartz window to window frames. In this embodiment, the manganese-molybdenum alloy serves as a wettable layer for the viscous liquid metal filler of for example, tin, bismuth, or indium.

As another example, liquid gallium alloy will self-wet silicon and germanium windows without the use of an intermediate wetting agent. Most liquid metals also will directly wet to many semiconductor windows since the surface of common semiconductors is metallic in nature. Even semiconductors such as silicon which are composed of highly covalent bonds act in a somewhat metallic manner at their surfaces. This allows liquid metals to directly form metallic bonds, that is wet, to the surface. This provides an alternative method for providing a wetting agent to non-semiconducting windows. Silicon may be deposited onto the surface of a nanocomposite or glass-like window, and the liquid metal filler will attach to the silicon layer with good wetting characteristics.

One of the properties of liquid metals is that the wetting of a compatible surface happens very quickly and the liquid spreads out over the surface at a very high rate of speed. Thin films of a filler will also tend to spread out over the window surface until viscous friction prevents further migration of the filler across the window. Therefore, a thinner filler layer will tend to self-limit migration across the surface and so not require further processing to restrain the filler to the window frame.

Figure 6B:
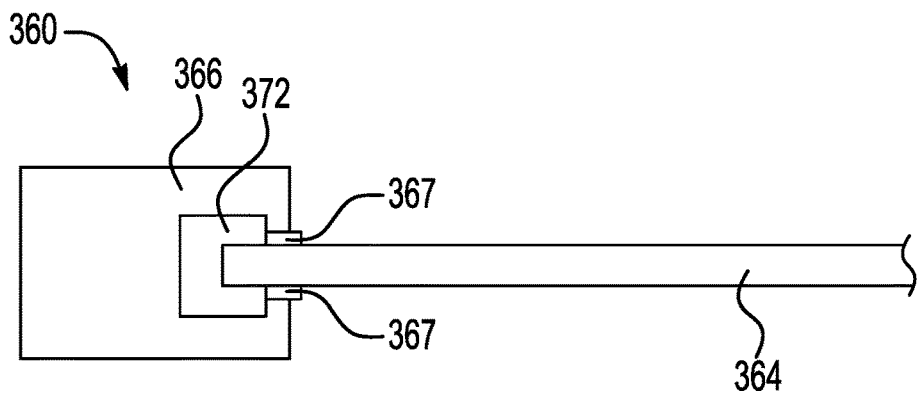
FIG. 6B is a schematic side view of a portion of a window installation that includes a migration stop to prevent migration of a wetting agent, according to a further embodiment of the disclosure

In cases where the filler is thick it is possible that the wetting properties of the liquid filler could extend past the frame and partially obscure light from passing through the window. FIG. 6B shows an embodiment where a mount 360 includes a migration stop 367 that is used to prevent unwanted migration of a filler material 372 onto a viewing surface of a window 364. As one example, gallium alloys easily wet semiconductor windows such as silicon and gallium arsenide. However these alloys will not wet boron nitride. Therefore a thin annulus of boron nitride may be deposited as the migration stop 367 onto an outer region of the window 364, to block the migration of gallium-based fillers (or other filler materials 372) from wetting the window 364 beyond the boron nitride layer. This retains the filler material 372 for use as the seal between the window 364 and a frame 366. In FIG. 6B, the migration stop 367 is shown in cross-section as an annulus or ring of material that prevents wetting migration of the filler past a predetermined point across the window. Typically this layer may only need to be a few 10's of nanometers to a few 100's of nanometers in thickness, so is not shown to scale in FIG. 6B, where the thickness of the migration stope 367 has been exaggerated for illustration purposes.

Figure 7:
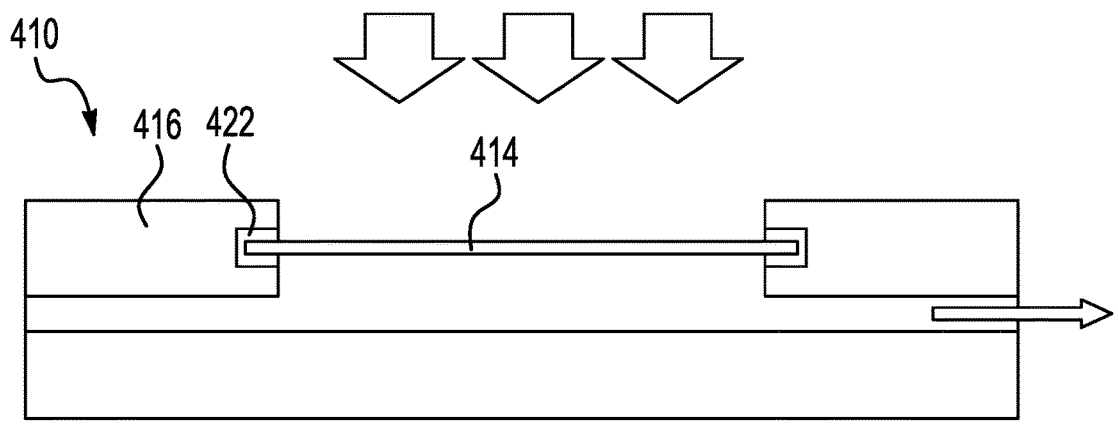
FIG. 7 is a schematic side view of a window installation without free supports, according to still another embodiment of the disclosure.

FIG. 7 shows another embodiment, a mount 410 with a filler material 422 that supports a window 414 in the connection between the window 414 and a frame 416. The filler material 422 is configured to hold the window 414 in place on its own, without the need for a support or supports like the supports 26 (FIG. 1). If the filler material 422 is thin enough then a free support would not be necessary. For example, a filler material 422 that surrounds the window at its edge and is 20 micrometers in thickness will serve to float the window 414 in its viscous state just as would a much thicker filler layer. Due to surface tension effects, such a very thin film will be extremely difficult to squeeze out by a differential pressure being applied across the front and back of the window. That is, pressure difference which will tend to squeeze out the filler and push the window 414 to one side of the frame 416 (or the other) will not have the same effect if the filler material 422 is very thin. The required or desired thickness of the filler material 422 depends upon the properties of the materials involved, but might be (to give non-limiting examples) 50 micrometers or less, or 20 micrometers or less.

Figure 8:
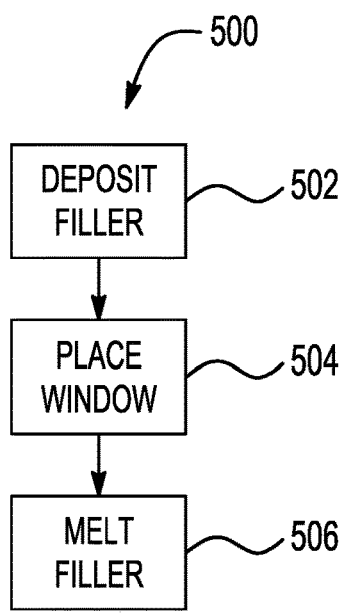
FIG. 8 is a high-level flow chart of a method according to an embodiment of the disclosure.

FIG. 8 shows steps of a method 500 for assembly of a window to a frame, such as in the above embodiments. In step 502 a portion of a window, such as an edge or rim, is coated with a filler material. This may be done by depositing the filler material by any of a variety of processes, such as (to give non-limiting examples) vacuum deposition, spraying, dipping, electroplating, of electroless plating.

In step 504 the window (along with the pre-deposited filler material) is placed into a frame. Subsequent heating, in step 506, melts the filler material, to cause the filler material to form a seal between the window and the frame.

Figure 9:
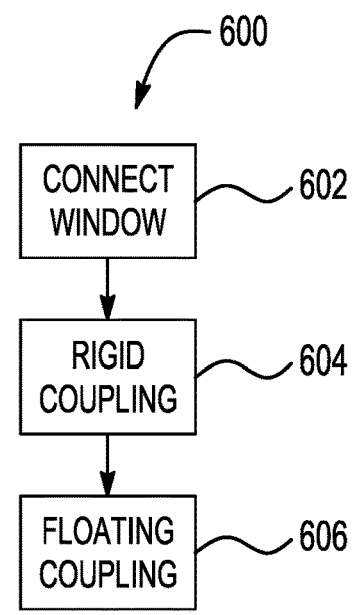
FIG. 9 is a high-level flow chart of another method according to an embodiment of the disclosure.

FIG. 9 shows steps of a method 600 of use devices such as described herein, in supporting a window. In step 602 the window is connected to a frame with a filler material, such as a phase-change filler material. In step 604 the filler material provides a relatively rigid coupling between the window and the frame when filler material is in a solid state. In step 606 the filler material is melted to provide a less rigid floating coupling between the window and the frame. Switching back and forth between the steps 604 and 606 may occur an indeterminate number of times.

Characteristics of the various embodiments described may be combinable in distinct embodiments, in any non-contradictory combination.

Although the disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A window installation on a hypersonic vehicle comprising:
    a window having an edge portion surrounding a central portion, the window also having a perimeter;
    a frame that surrounds the perimeter of the window, but does not encapsulate the window, wherein the frame has walls that define at least one cavity in which the window sits without making contact with the walls, wherein the frame does not change phases at hypersonic speeds;
    a filler material that provides connection between the window and the frame, wherein the filler material is a phase-change material that changes phases when the vehicle is moving at hypersonic speeds, wherein the connection is a floating connection when the filler material is in a liquid state, and wherein the connection is more rigid than the floating connection, when the filler material is in a solid state;
    wherein the edge portion is inserted into the filler material, and the filler material does not extend to the central portion.

2. The installation of claim 1, further comprising one or more supports that support the window when the filler material is in the liquid state.

3. The installation of claim 2, wherein the one or more supports make contact with the window.

4. The installation of claim 3, wherein the one or more supports make contact with an inner surface of the window.

5. The installation of claim 2, wherein the one or more supports are at least partially within the filler material.

6. The installation of claim 1, further combination with a coolant that flows past and cools the window.

7. The installation of claim 6, wherein surface tension of the filler material is high enough so that the coolant flowing past the window is excluded from a volume occupied by the filler material.

8. The installation of claim 1, wherein the filler material is a metal material.

9. The installation of claim 1, wherein the metal material is a material selected from the group consisting of tin, indium, gallium, bismuth, or combinations thereof.

10. The installation of claim 1, wherein the filler material is a chalcogenide.

11. The installation of claim 1, wherein the filler material is a glass material.

12. The installation of claim 1, wherein the filler material is electrically conductive, providing electrical conductivity between the window and the frame.

13. The installation of claim 1, further comprising a wetting agent on part of an external surface of the window, to control adherence between the window and the filler material.

14. The installation of claim 1, wherein the filler material has a phase change temperature below a thermal shock limit of the window.

15. The installation of claim 1, wherein the filler material is configured to use surface tension to maintain the window in place when the filler material is in the liquid state.

16. The installation of claim 1, further comprising a heater operatively coupled to the filler material, the heater configured to selectively change phase of the filler material.

17. The installation of claim 1, further comprising a sensor that is operatively coupled to the window.

18. A hypersonic vehicle comprising:
    the installation of claim 1.

19. The installation of claim 1, wherein the filler material provides a seal between the edge portion and the frame.

20. A hypersonic vehicle comprising:
- a window installation that includes:
    - a window having an edge portion surrounding a central portion, the window also having a perimeter;
    - a frame that surrounds the perimeter of the window, but does not encapsulate the window, wherein the frame has walls that define at least one cavity in which the window sits without making contact with the walls, wherein the frame does not change phases at hypersonic speeds;
    - a filler material that provides connection between the window and the frame, wherein the filler material is a phase-change material that changes phases when the vehicle is moving at hypersonic speeds, wherein the connection is a floating connection when the filler material is in a liquid state, and wherein the connection is more rigid than the floating connection, when the filler material is in a solid state; and
    - a sensor operatively coupled to the window;
    - wherein the edge portion is in contact with the filler material, and the filler material does not extend to the central portion.

* * * * *